United States Patent
Ji et al.

(10) Patent No.: US 8,615,574 B2
(45) Date of Patent: Dec. 24, 2013

(54) SYSTEM FOR CONTROLLING AND MANAGING NETWORK APPARATUS AND METHOD THEREOF

(75) Inventors: Yun-Geun Ji, Gwangju-si (KR); Jong-Keun Park, Seoul (KR); No-Kwan Kwak, Seoul (KR); Sang Hwa Oh, Seoul (KR); Gyoung-Bo Park, Seongnam-si (KR); Young-Jae An, Yongin-si (KR)

(73) Assignee: KT Corporation, Gyeonggi-do (KR)

( * ) Notice: Subject to any disclaimer, the term of this patent is extended or adjusted under 35 U.S.C. 154(b) by 911 days.

(21) Appl. No.: 12/058,599

(22) Filed: Mar. 28, 2008

(65) Prior Publication Data
US 2008/0250132 A1 Oct. 9, 2008

Related U.S. Application Data

(63) Continuation of application No. PCT/KR2006/003827, filed on Sep. 29, 2006.

(30) Foreign Application Priority Data

Sep. 30, 2005 (KR) .................. 10-2005-0092411

(51) Int. Cl.
*G06F 15/16* (2006.01)
*G06F 15/173* (2006.01)
(52) U.S. Cl.
USPC ........... 709/223; 709/224; 709/225; 709/208; 709/219; 709/203; 709/230; 709/201
(58) Field of Classification Search
USPC ....................................................... 709/223
See application file for complete search history.

(56) References Cited

U.S. PATENT DOCUMENTS 5,909,549 A * 6/1999 Compliment et al. ........ 709/223
6,651,190 B1 11/2003 Worley et al.
(Continued)

FOREIGN PATENT DOCUMENTS

EP 0 673 176 A1 9/1995
EP 1 162 852 A1 12/2001
(Continued)

OTHER PUBLICATIONS

International Search Report dated Jan. 23, 2007 in PCT/KR2006/003827, which is the parent application of this application.
(Continued)

*Primary Examiner* — Rupal Dharia
*Assistant Examiner* — Mohammed Ahmed
(74) *Attorney, Agent, or Firm* — IP Legal Services, LLC (57) ABSTRACT

Disclosed is a network device control and managing system and method. The network device control and managing system receives network device information and subscriber information from a database server of the network device control and managing system according to the manager's client information request and realizes hierarchical combined information. The system requests state information from the network device based on the state information request of the network device and receives the state information. The system requests a control from the network device based on the network device control request, receives a corresponding response message, and changes combined information. Therefore, the device states can be easily searched in the hierarchical manner (L3-L2-AP), and the problems of network devices can be quickly sensed. Also, software for the network devices is remotely updated, and the subscriber's after sales service request is remotely processed.

21 Claims, 8 Drawing Sheets

(56) References Cited

U.S. PATENT DOCUMENTS

| | | | |
|---|---|---|---|
| 6,766,165 B2* | 7/2004 | Sharma et al. | 455/423 |
| 2003/0065731 A1* | 4/2003 | Mohammed et al. | 709/208 |
| 2003/0108046 A1* | 6/2003 | Simeone | 370/395.1 |
| 2004/0160905 A1* | 8/2004 | Bernier et al. | 370/310 |
| 2004/0196794 A1* | 10/2004 | Fu | 370/254 |
| 2004/0196810 A1* | 10/2004 | Kil et al. | 370/331 |
| 2005/0094663 A1* | 5/2005 | Rahman et al. | 370/466 |
| 2005/0113029 A1 | 5/2005 | Koivukangas et al. | |
| 2005/0120082 A1* | 6/2005 | Hesselink et al. | 709/203 |
| 2005/0138186 A1* | 6/2005 | Hesselink et al. | 709/229 |
| 2005/0207347 A1* | 9/2005 | Ishinishi et al. | 370/241 |
| 2005/0272403 A1* | 12/2005 | Ryu et al. | 455/403 |
| 2006/0036719 A1* | 2/2006 | Bodin et al. | 709/223 |
| 2006/0224897 A1* | 10/2006 | Kikuchi et al. | 713/182 |
| 2006/0239254 A1* | 10/2006 | Short et al. | 370/352 |
| 2007/0010261 A1* | 1/2007 | Dravida et al. | 455/456.3 |
| 2009/0279701 A1* | 11/2009 | Moisand et al. | 380/270 |
| 2010/0265947 A1* | 10/2010 | Kokot et al. | 370/390 |

FOREIGN PATENT DOCUMENTS

| | | |
|---|---|---|
| JP | 2003-125078 A | 4/2003 |
| KR | 10-2001-0105428 A | 11/2001 |
| KR | 10-2003-0096695 A | 12/2003 |
| KR | 10-2005-0087318 A | 8/2005 |

OTHER PUBLICATIONS

Written Opinion dated Jan. 23, 2007 in PCT/KR2006/003827, which is the parent application of this application.

* cited by examiner

| ○ Tel | ○ ID | ○ L2 Port | ● AP-IP | AP-IP Address Input | 211.51.30.130 | | Search | Diagnose | AS service without visit |
|---|---|---|---|---|---|---|---|---|---|

| Yongdong Shop at Seocho Branch in Kangnam Center | | Session release | IDSS info | View in detail | | | | CM real-time ref. | View in detail |
|---|---|---|---|---|---|---|---|---|---|
| Subscriber name | Entop Engineering Ltd. | Access no. | 10527216 | 10527216 ▶ | | Client terminal info | | Wireless additional ID | |
| Client ID | s5677301 | Password | | | | | Client ID | | |
| Service title | NTOPIAE(NESPOT) | Authentication method | | | | O/S | Windows XP family | MAC | 000CF10FE566 |
| Service ID | 10512486360 | Opening date | | | | IP address | 220.117.210.180 | Card type | Intel(R) PRO/Wir |
| Additional ID | s5677301(Wireless additional IDID) | Session info | | | | SSID | 1052-7216 | Card version | 1.2.1.3 |
| Installation | 720 Solleng Daerim Acrotel Officetel 140-3 Samsung-dong Kangnam-ku Seoul | | | | | CM version | 4111 | Receiving Intensity | -48 |
| | | | | | | Recent access date | 2005-08-19 07:24 | Current access date | |
| L2 info | Real PORT | IP-POOL | Test | Reset port | View in detail | AP info | Real AP | Test | Log in | Reboot | View in detail |
| DSLAM/IP-xDSL | NTOPOA-E(v1124) | Subscriber name | E0260141-0004 | | | AP IP | 211.51.30.158 | AP MAC | 00:30:0d:1a:cde |
| Device IP (Concentrator) | 210.183.243.8 | MAC setting/access | No. of limit (6), and no. of access (1) | | | Device model no. | MW-1500AP | Supply/manufacturer | Mercury/MMC |
| Grouped installation title | 140-3 Samsung-dong | Port state/link | Enable - link (on) | | | Authenticate setting state | | Authentication server IP | |
| Profile | | Current speed | 100M/100M(Full) | | | SSID setting value | | Current version | |

| Configuration network diagram | | | | | | Reset performance info | Reset L2 device ID/Password | | |
|---|---|---|---|---|---|---|---|---|---|
| IP-xDSL | L3-Info | L2-Info | AP-Info | PC-Info | Client info | IP setting info | | PORT info. 4 | |
| Model no. | V1124 | CRC_Error | Drop Feames | | | IP Address | 210.183.243.81 | Set port state | Enable Disable Change setting values |
| Version | 7.48 #1704 | Collision | Late Collision | | | Gate Way | 210.183.243.126 | Set limit no. of MAC 6 | |
| EMS IP | | | | | | Subnet Mask | 255.255.255.192 | Real PORT | Apply port |
| DJ ID | | OverSize Frames | UnderSize Frames | | | | | PORT info. 4 | |
| TIE No. | E0260141 | | | | | | | Device info database (port:4) Matched | |
| Cable No. | | | | | | | | | |

SYSTEM FOR CONTROLLING AND MANAGING NETWORK APPARATUS AND METHOD THEREOF

CROSS-REFERENCE TO RELATED PATENT APPLICATIONS

This application is a continuation application under 35 U.S.C. § 365(c) of International Application No. PCT/KR2006/003827, filed Sep. 29, 2006 designating the United States. International Application No. PCT/KR2006/003827 was published in English as WO2007/037612 A1 on Apr. 5, 2007. This application further claims the benefit of the earlier filing dates under 35 U.S.C. §365(b) of Korean Patent Application No. 10-2005-0092411 filed Sep. 30, 2005. This application incorporates herein by reference the International Application No. PCT/KR2006/003827 including the International Publication No. WO2007/037612 A1 and the Korean Patent Application No. 10-2005-0092411 in their entirety.

BACKGROUND

1. Field

The present disclosure relates to controlling and managing a network device. Mpore particularly, the present disclosure relates to a system and method for hierarchically controlling and managing a network device.

2. Discussion of the Related Technology

As the information communication techniques have been developed very quickly, demands for high-speed data communication have been increased in addition to speech communication and requirements on the wireless local area network (WLAN) service having solved the spatial limit problem have also been increased. Accordingly, wireless local area network (WLAN) service providers install a plurality of wireless access devices to enlarge specific areas available for the wireless local area network (WLAN) service so that many managers may use various wireless Internet services.

The increase of the Internet services has increased the requests on the after sales service (AS) for the clients' service and network devices, and the Internet service providers have managed after sales service call centers and Internet centers.

In general, the after sales service that is provided after making a purchase on a specific service or a product is performed when the client calls an after sales service (AS) center or he requests the after sales service on the Internet. Regarding the calling after sales service (AS), when a manager accepts a problem of the corresponding service or product through a telephone call, a corresponding person in charge directly visits the manager to repair the product or check the QoS. Regarding the Internet after sales service (AS), when a manager accesses a specific homepage and accepts a problem, a corresponding person in charge directly visits the manager to repair the product or check the QoS.

As to the Internet after sales service (AS) system, Korean Patent Application No. 2002-0033690 discloses "Remote after sales service system for wireless subscriber station", which discloses a technique for accessing a remote AS system by using a wireless subscriber station, and providing a real-time online service to a user client having requested an after sale service so as to solve the error generated in the user client's wireless subscriber station or update applications.

The after sales service system receives a predetermined after sales service request according to a manager's request and controls the corresponding person in charge to visit the manager in person and repair the product or check the QoS, and hence, the person in charge must visit the manager and process trivial problems such as a simple program error or a failure of finding an access point (AP).

Also, the person in charge can control the subscriber station, the AP, or other network devices in response to the AS request by using a predetermined program, but he updates specific devices or measures errors for the specific devices and cannot control the network devices as a whole, thereby failing to efficiently and systematically control the network devices.

The foregoing discussion is to provide general background information, and does not constitute an admission of prior art.

SUMMARY

One aspect of the present invention provides a network device control and managing system and method having advantages of remotely controlling and managing the network device.

In one aspect of the present invention, a system for controlling and managing network device including a subscriber station connected through a first network, and access point (AP), a concentrator, and a concentration switch includes: a database server for hierarchically storing network device information and subscriber information corresponding to an after sales (AS) service request information provided by the subscriber station; a web server, connected to the database server, for providing the network device information and subscriber information stored in the database server according to a received predetermined data request; and a control and managing terminal for transmitting/receiving data to/from the web server, requesting predetermined data from the web server, and controlling and managing the network device based on the network device information and subscriber information corresponding to the after sales service request information.

The control and managing terminal includes: a storage module for receiving and storing the network device information and the subscriber information; a web providing module for providing hierarchical combined information in the web format based on the network device information and subscriber information of the storage module; a control and managing module for generating a predetermined control instruction based on a manager request provided by the manager, transmitting the predetermined control instruction to at least one of the network devices, and receiving a predetermined response message on the predetermined control instruction; and a system control module for controlling the storage module, the web providing module, and the control and managing module, receiving the network device information and the subscriber information from the database server according to the received manager request, storing the same information in the storage module, and providing the predetermined response message provided by the control and managing module to the web providing module and the storage module.

In another aspect of the present invention, a method for providing combined state information for a network device in a control and managing terminal of a system for controlling and managing network device including a subscriber station connected through a first network, and access point (AP), a concentrator, and a concentration switch includes: a) receiving network device information and subscriber information from a database server of the network device control and managing system according to the manager's client information request; b) realizing hierarchical combined information based on the received network device information and subscriber information; c) receiving a network configuration device state request from the manager and generating a state request message; d) transmitting the state request message to the network device; and e) receiving a response message for the state request message, and changing the realized hierarchical combined information based on the received response message.

The step e) includes: changing the realized combined information by comparing information omitted or unmatched from the realized hierarchical combined information with the response message received from the predetermined network device.

In another aspect of the present invention, a method for controlling and managing a network device in a control and managing terminal of a system for controlling and managing network device including a subscriber station connected through a first network, and access point (AP), a concentrator, and a concentration switch includes: a) receiving network device information and subscriber information from a database server of the network device control and managing system according to the manager's client information request; b) realizing combined information based on the received network device information and subscriber information; c) receiving a state information request of the network device from the manager and generating a state information request message; d) transmitting the state information request message to the first device, and receiving state information; e) receiving a control request for controlling the first device from the manager, and generating a predetermined control message; and f) transmitting the predetermined control message to the first device, receiving a response message according to a control, changing the realized combined information according to the received response message, and providing the changed information to the manager.

The manager's client information request includes at least one of a telephone number, a client ID, a device port number, and an access point (AP) Internet protocol (IP) address.

BRIEF DESCRIPTION OF THE DRAWINGS

FIG. 6 shows a second exemplified screen displayed when the control and managing terminal of the network device control and managing system according to an embodiment of the present invention.

FIG. 7A shows an exemplified screen displayed when a real AP IP is detected in the control and managing terminal of the network device control and managing system according to an embodiment of the present invention.

DETAILED DESCRIPTION OF EMBODIMENTS

Various embodiments of the present invention will hereinafter be described in detail with reference to the accompanying drawings.

In the following detailed description, only certain embodiments of the present invention have been shown and described, simply by way of illustration. As those skilled in the art would realize, the described embodiments may be modified in various different ways, all without departing from the spirit or scope of the present invention. To clarify features of the present invention in the drawings, parts that are not related to the descriptions are omitted and the same elements have the same reference numerals over the specification.

Also, the term of module described in the specification represents a unit for processing a predetermined function or operation, and it can be realized by hardware, software, or combination of hardware and software.

A network device control and managing system and method according to an embodiment of the present invention will now be described in detail with reference to drawings.

Figure 1:
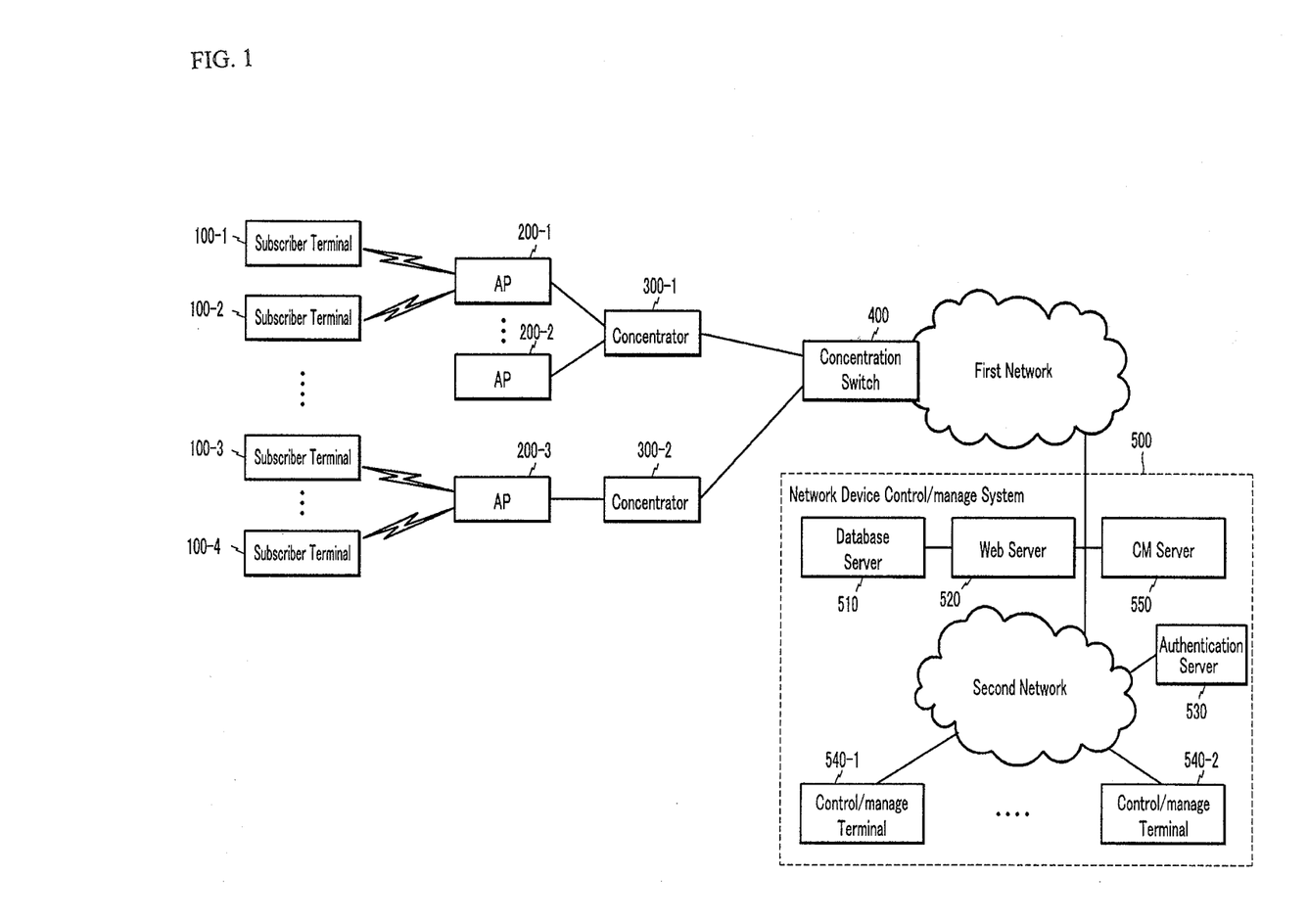
FIG. 1 shows a block diagram of a network system for providing a remote network device control and managing service according to an embodiment of the present invention.

FIG. 1 shows a block diagram of a network system for providing a remote network device control and managing service according to an embodiment of the present invention.

The network device control and managing system 500 of the network system for providing a remote network device control service according to an embodiment of the present invention receives after sales service (AS) requests from a plurality of subscriber stations 100 and remotely provides an after sales service (AS) for the network device. Particularly, the network device control and managing system 500 can upgrade software of the subscriber station 100 and software of the AP, and can configure an efficient combined database to efficiently provide information (e.g., client information, client subscriber station information, malfunction history, authentication, and quality information) needed for tests, control, and analysis on the malfunction according to the request by the control and managing terminal.

As shown in FIG. 1, the network system 500 for providing a remote network device control and managing service includes a subscriber station 100, an access point (AP) 200, a concentrator 300, a concentration switch 400, and a network device control and managing system 500.

The subscriber station 100 generates an after sales service request information (AS service request data) according to the subscriber' request and transmits the same to the network device control and managing system 500. In this instance, the subscriber station uses a wireless subscriber station for transmitting and receiving wireless data, and it is possible to realize the subscriber station by using a wired subscriber station for transmitting and receiving wireless data.

The access point (AP) 200 transmits the wireless data information provided by the subscriber stations 100 to the concentrator 300.

The concentrator 300 transmits information provided by a plurality of access points (AP) 200 to the concentration switch 400. In this instance, the concentrator 300 is classified as the DSLAM, IP-xDSL, and ATM DSLAM.

The concentration switch 400 transmits information provided by a plurality of concentrators 300 to the network control and managing system 500 through a first network. In this instance, the first network is an Internet service network provided by an Internet service provider.

The network devices including the subscriber station 100, the access point (AP) 200, the concentrator 300, and the concentration switch 400 provides status information or changes setting according to a predetermined instruction of the network device control and managing system 500.

The network device control and managing system 500 is connected to a plurality of concentration switches 400 and the first network to receive AS request information, analyzes the test, control, and malfunctions of the network devices including the access point (AP) 200, the concentrator 300, and the concentration switch 400 based on the received information, and controls the subscriber station 100, the access point (AP) 200, the concentrator 300, and the concentration switch 400 according to a manager's request. Also, the network device control and managing system 500 includes a database server 510, a web server 520, an authentication server 530, a connection manager (CM) server 550, and a control and managing terminal 540.

The database server 510 stores subscriber information on the subscriber's client information, terminal information, and facilities information, and particularly, it hierarchically stores network device information corresponding to the AS request provided by the subscriber station 100.

The web server 520 is connected to the first network and the second network and provides the web service. Also, the web server 520 provides data of the database server 510 according to the data request by the control and managing terminal 540, and it requests the authentication server 530 to authenticate the manager according to the authentication request by the control and managing terminal 540.

The authentication server 530 is connected to the second network, and authenticates the manager according to the authentication request by the control and managing terminal 540 input from the web server 520.

The connection manager (CM) server 550 is a server for managing the Internet access and data flow of the subscriber station 100 or the control and managing terminal 540, and it stores the data flow between the network devices and the control and managing terminal 540 in real-time and provides the same to the control and managing terminal 540.

The control and managing terminal 540 is connected to the second network, and it provides combined state information on the specific network device and state information on the respective devices according to the manager's request and controls specific network devices. In this instance, the specific network devices include the subscriber station 100, the access point (AP) 200, the concentrator 300, and the concentration switch 400.

Here, the second network of the network device control and managing system 500 represents a private network for a personal service provider or a specific purpose.

Further, the control and managing terminal 540 can be an Internet available general terminal, and it receives a predetermined software program for network device control and management from a predetermined server and controls and manages the network devices.

The network device control and managing system in one embodiment of the present invention uses the wireless Internet environment including the access point, and the wired Internet environment is also available.

The network device control and managing system 500 can hierarchically analyze and manage state information of the network devices based on the AS request provided by the subscriber, and can selectively control specific network devices.

Figure 2:
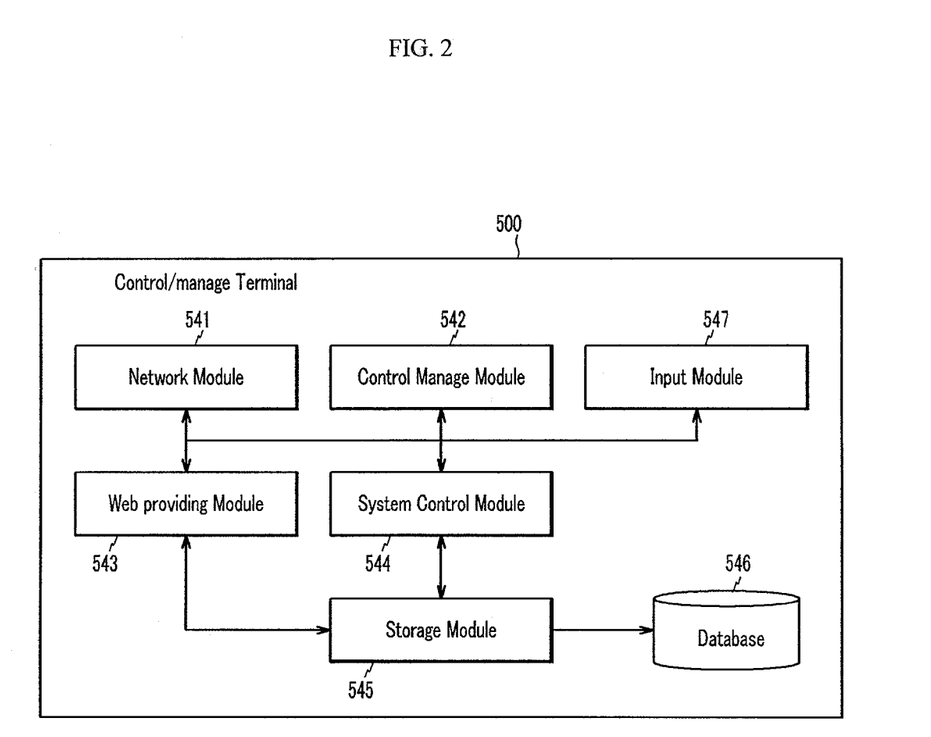
FIG. 2 shows a detailed block diagram of a control and managing terminal according to an embodiment of the present invention.

FIG. 2 shows a detailed block diagram of a control and managing terminal according to an embodiment of the present invention.

As shown in FIG. 2, the control and managing terminal 540 provides information needed for analyzing the test, control, and malfunctions based on the network device information and subscriber information corresponding to the subscriber's AS request stored in the database server 510 and controls the specific device according to the manager's request, and the control and managing terminal 540 includes a network module 541, a control and managing module 542, an input module 547, a web providing module 543, a system control module 544, and a storage module 545.

The input module 547 receives the manager's request and transmits the same to the system control module 544 and the control and managing module 542. In this instance, the manager's request is used to search for network device information from the database server 510 and control specific network devices, and it includes a telephone number, a client ID, a device port number, an access point (AP) Internet protocol (IP) address, and a specific network device control request wherein the access point is a wireless access device.

The network module 541 includes a network interface and is connected to the second network, and it transmits and receives data with the control and managing module 542, the web providing module 543, and a system control module 544.

The control and managing module 542 generates a predetermined control instruction based on the manager's request provided by the input module 547 and transmits the control instruction to a predetermined network device, and generates device state information based on the response data provided by the network device and transmits the device state information to the system control module 544. Also, the control and managing module 542 receives data flow information between the network device and the control and managing terminal 540 from the CM server 550 and transmits the data flow information to the storage module 545, requests data flow information from the CM server 550 according to the real-time data flow information request provided by the input module 547, and provides the corresponding information to the system control module. In this instance, the network includes a subscriber station 100, an access point (AP) 200, a concentrator 300, and a concentration switch 400.

The storage module 545 temporarily stores the network device information and subscriber information provided by the database server 510 in the database 546, and the stored network device information is updated by the system control module 544. Also, the storage module 545 receives the data flow information from the control and managing module 542 and stores the same in the database 546.

In this instance, subscriber information includes client information, terminal information, and facilities information, the client information includes a telephone number, a client ID, a device port number, an access point (AP) Internet protocol (IP) address, and the subscriber station state information includes an operating system (O/S) of the subscriber station, a CM (Connection Manager) operating version, a wireless local area network (WLAN) card type, and the wireless local area network's (WLAN) received signal intensity (dBm).

The storing process by the storage module reduces the system load by reducing the process for accessing the database server and reading data when reading again the existing searched information after performing a new search according to the manager's request.

Figure 5:
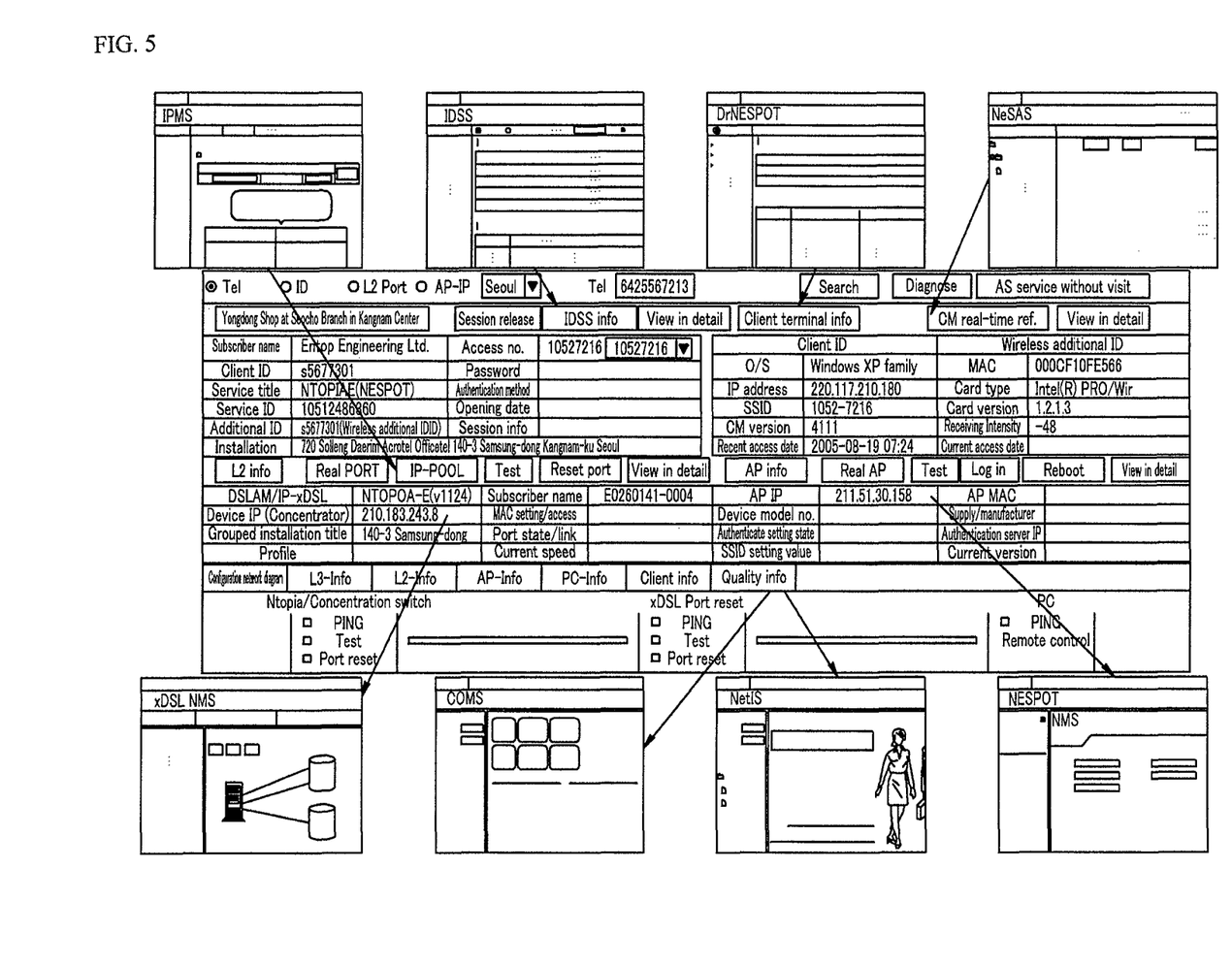
FIG. 5 shows a first exemplified screen displayed when the control and managing terminal of the network device control and managing system according to an embodiment of the present invention.

The web providing module 543 is connected to the system control module 544 and the control and managing module 542, and the web providing module 543 reads network device information and subscriber information of the storage module 545 to realize the information to be integrated web data, and provides the web data as shown in FIG. 5.

The system control module 544 controls the respective modules, and it receives network device and subscriber information from the database server 510 based on the manager's request provided by the input module 547 and transmits the same to the storage module 545. Also, the system control module 544 performs a subscriber station remote control function according to the manager's request provided by the input module 547. Also, the system control module 544 compares facilities information omitted from the network device information provided by the database server 510 and non-matched network device information with a port number, a MAC address, and an Internet protocol (IP) address of the response message provided by a specific network device, and detects real facilities information on the equipment.

The network device control and managing system 500 has advantages in reading client line information, network device information of a specific subscriber station including client information, and subscriber information from the database server 510, combining the information so that the may easily use the information, providing the combined information in the web format, and remotely testing and controlling the network device and the terminal according to the manager's request.

Figure 3:
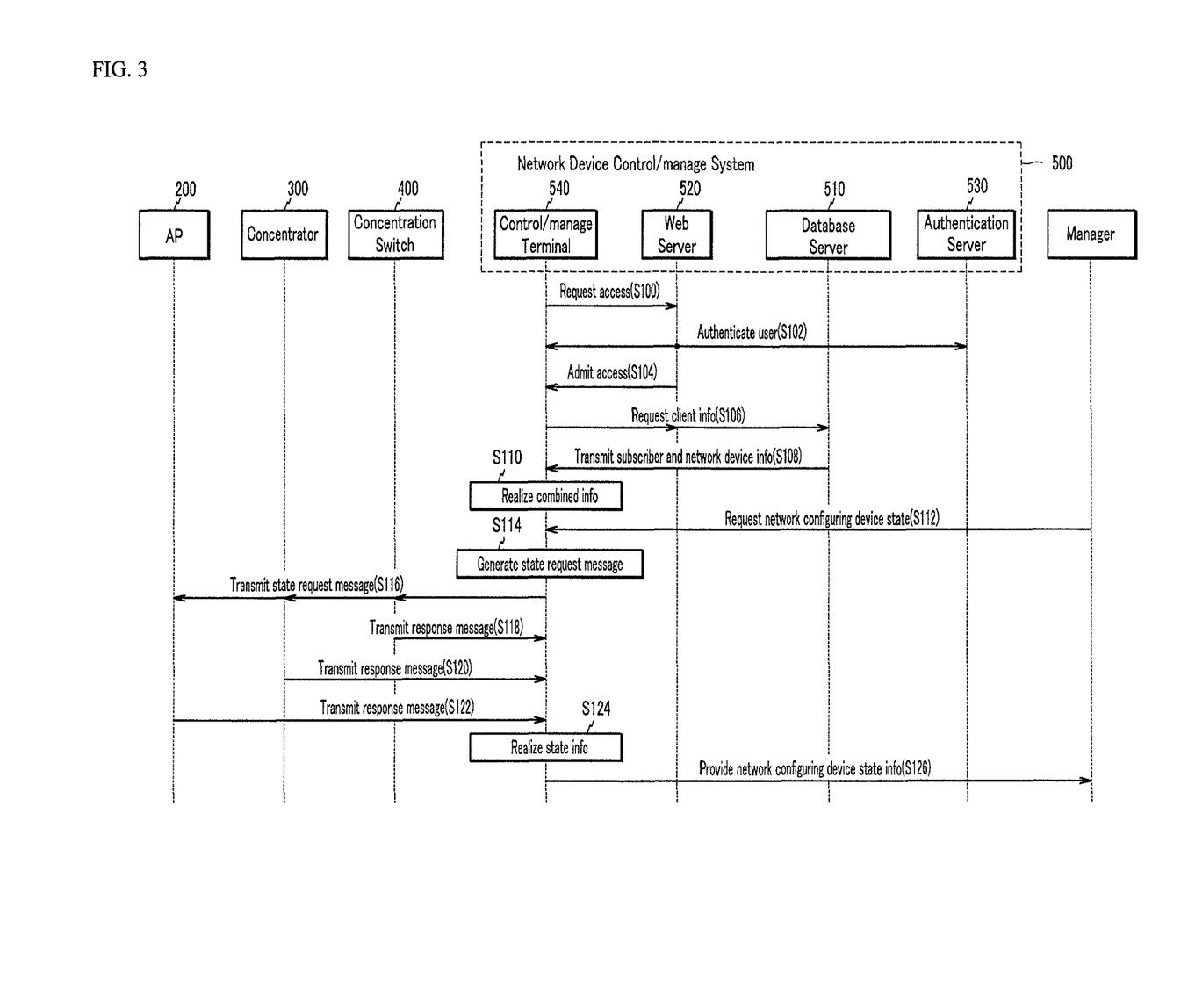
FIG. 3 shows a data flowchart of a method for providing state information of a hierarchical network device in a network device control and managing system according to an embodiment of the present invention.

FIG. 3 shows a data flowchart of a method for providing state information of a hierarchical network device in a network device control and managing system according to an embodiment of the present invention.

As shown in FIG. 3, the method for the network device control and managing system 510 to provide hierarchical network device information is performed when the control and managing terminal 540 requests to access the web server 520.

First, the database server 510 is assumed to receive and store AS request information from a plurality of subscriber stations 100. The assumption relates to a general process for receiving AS information request and storing and managing the same, and hence, no detailed description thereof will be provided.

The control and managing terminal 540 requests an access from the web server 520 so as to acquire information on a specific subscriber (S100). The web server 520 receives the access request and requests user authentication from the control and managing terminal 540, and authenticates the user based on the authentication information of the authentication server 530 (S102, S104).

In this instance, the web server 520 does not accept the access request of the control and managing terminal 540 when the user is not authenticated.

The control and managing terminal 540 requests client information from the database server 510 when the user is authenticated (S106). In this instance, the client information request is performed based on the manager's request, and it includes one of a telephone number, a client ID, a device port number, and an access point (AP) Internet protocol (IP) address.

The database server 510 transmits subscriber information and network device information searched based on the corresponding client information to the control and managing terminal 540 based on the client information request provided by the control and managing terminal 540 (S108). The subscriber information includes client information, subscriber station information, and facilities information, the client information includes a telephone number, a client ID, a device port number, and an access point (AP) Internet protocol (IP) address, and the subscriber station information includes an operating system (O/S) of the accessed subscriber station, a CM (Connection Manager) operation version, a wireless local area network (WLAN) card type, and a wireless local area network (WLAN)'s received signal strength (dBM) wherein the AP is a wireless access device.

The control and managing terminal 540 realizes web-type hierarchical and combined information based on the subscriber information and network device information provided by the database server 510, and provides the realized information to the manager (S110).

On receiving a network configuring device state request from the manager (S112), the control and managing terminal 540 generates a state request message and provides the state request message to the network device (S114, S116). In this instance, the state request message is transmitted to the network devices, used by a predetermined subscriber station 100, including the concentration switch 400, the concentrator 300, and the access point (AP) 200 based on the network device information stored in the storage module.

The network device receives the state request message, and transmits a response message corresponding to the state to the control and managing terminal 540 (S118, S120, S122).

The control and managing terminal 540 changes state information based on the received response message, realizes the web-type hierarchical and combines data based on the changed information, and provides the manager with state information on the hierarchical combined network configuration device (S124, S126). The change of the state information is performed by the information that is generated by comparing the response message with information that is omitted or non-matched from among the network device information and subscriber information received from the database server 510 and is then changed by the control and managing terminal 540.

The method for providing combined state information on the hierarchical network devices has advantages in reading subscriber information and network device information for a specific subscriber station including facilities information, client information, and subscriber station information provided by the manager's request, combines the information and provides it in the web data format so that the manager may easily use the information. Also, since the corresponding person in charge can easily search and view the device state in the hierarchical (L3-L2-AP) manner in the case of an after sales service, it is possible to quickly handle the problem states.

Figure 4:
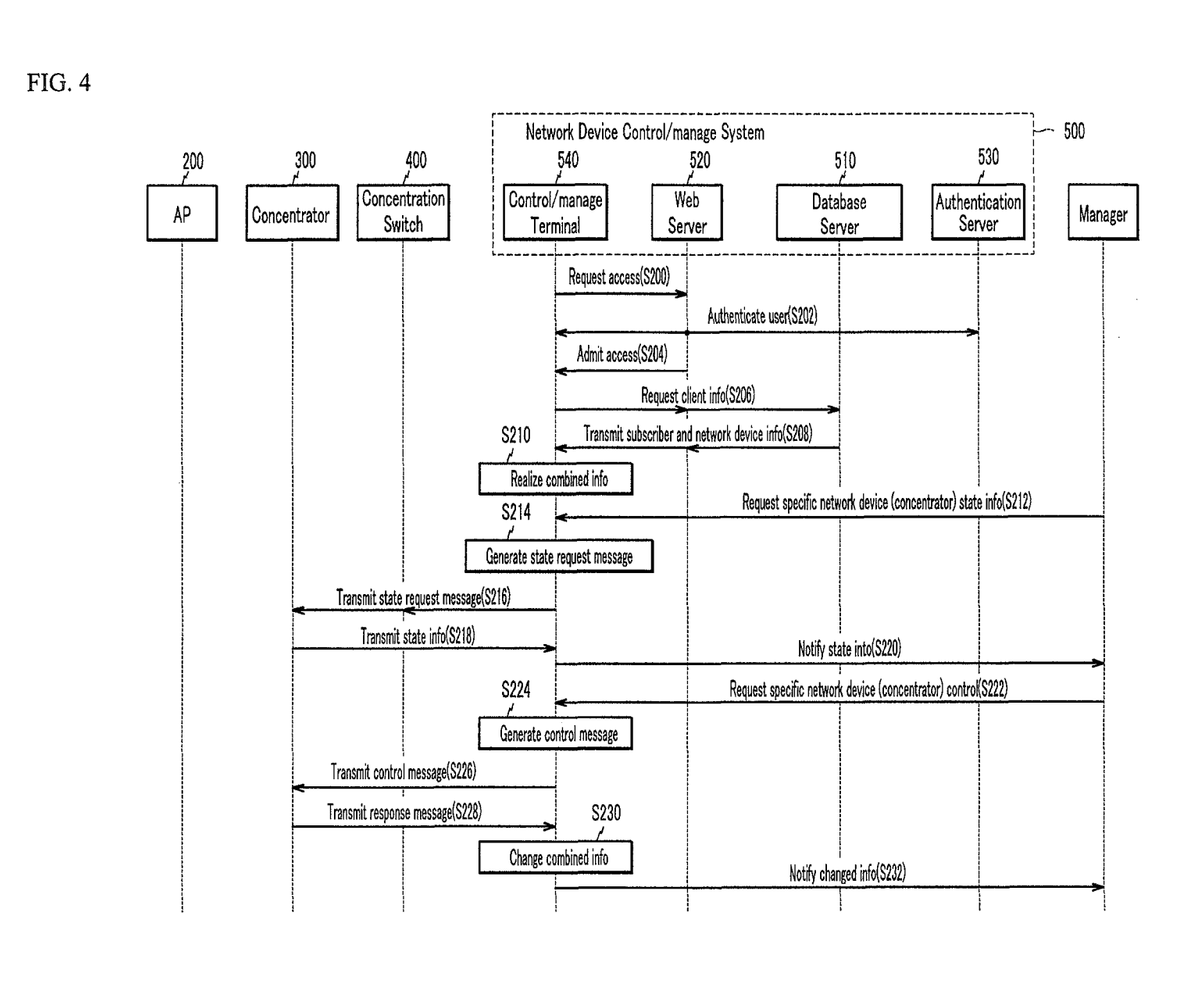
FIG. 4 shows a data flowchart of a method for controlling and managing a network device in a network device control and managing system according to an embodiment of the present invention.

FIG. 4 shows a data flowchart of a method for controlling and managing a network device in a network device control and managing system according to an embodiment of the present invention.

As shown in FIG. 4, the method for controlling and managing the network devices in the network device control and managing system 500 is performed when the control and managing terminal 540 requests an access from the web server 520.

First, the database server 510 is assumed to receive and store AS request information from a plurality of subscriber stations 100. The assumption relates to a general process for receiving AS information request and storing and managing the same, and hence, no detailed description thereof will be provided.

The control and managing terminal 540 requests an access from the web server 520 so as to acquire subscriber information and network device information for an after sales service (S200). The web server 520 receives the access request and requests user authentication from the control and managing terminal 540, and authenticates the user based on the authentication information of the authentication server 530 (S202, S204).

In this instance, the web server 520 does not accept the access request of the control and managing terminal 540 when the user is not authenticated.

The control and managing terminal 540 requests client information from the database server 510 when the user is authenticated (S206). In this instance, the client information request is performed based on the manager's request, and it includes one of a telephone number, a client ID, a device port number, and an access point (AP) Internet protocol (IP) address.

The database server 510 transmits subscriber information and network device information searched based on the corresponding client information to the control and managing terminal 540 based on the client information request provided by the control and managing terminal 540 (S208). The subscriber information includes client information, subscriber station information, and facilities information, the client information includes a telephone number, a client ID, a device port number, and an access point (AP) Internet protocol (IP) address, and the subscriber station information includes an operating system (O/S) of the accessed subscriber station, a CM (Connection Manager) operation version, a wireless local area network (WLAN) card type, and a wireless local area network (WLAN)'s received signal strength (dBM) wherein the AP is a wireless access device.

The control and managing terminal 540 realizes web-type combined information based on the subscriber information and network device information provided by the database server 510, and provides the realized information to the manager (S210).

On receiving a specific network device state information request from the manager (S212), the control and managing terminal 540 generates a specific network device state information request message and provides the request message to the specific network device (S214). In this instance, the state information request message is transmitted to a specific network device, used by a specific subscriber station, including one of the concentration switch 400, the concentrator 300, and the access point (AP) 200 based on the network device information stored in the storage module 545. (S216).

In this instance, the state information request message transmitted to the concentrator 300 is generated according to the type of the concentrator L2.

In one embodiment of the present invention, a concentrator is only used to control the concentrator 300, and transmission for controlling the concentration switch 400, the access point (AP) 200, and the subscriber station 100 is also possible.

The concentrator 300 receives a information request message, and transmits the current state information of the concentrator 300 to the control and managing terminal 540 (S218). In this instance, the current state information includes the number of allocatable IPs (Internet Protocols) and the number of IPs in use.

The control and managing terminal 540 receives the current state information from the concentrator 300, and provides state information to the manager (S220).

On receiving a concentrator control request from the manager, the control and managing terminal 540 generates a specific control message based on the control request, and transmits the specific control message to the concentrator 300 (S222, S224, S226). In this instance, the specific control message includes port control information, profile request information, initialization information, and MAC control information. The port control information indicates active/ inactive information of the port state, and the initialization information represents a performance information initialization function for the ATM. Also, the MAC control information represents information for establishing and controlling the MAC for determining the acceptance capacity of the subscriber station for each line of the concentrator.

The concentrator 300 receives a specific control message, changes the setting for a specific control, generates a corresponding response message, and transmits the response message to the control and managing terminal 540 (S228).

The control and managing terminal 540 changes combined information and notifies the manager of the change based on the response message so that the changed information may be included in the current information (S230, S232).

The network device controlling method has advantages in reading subscriber information for a specific subscriber station including client line information and client information according to the manager's request and network device information from the database server, combining the information for an easy use by the manager, and providing the combined information in the web format for an easy use by the manager, and remotely testing and controlling the network devices and subscriber station according to the manager's request.

FIG. 5 shows a first exemplified screen displayed when the control and managing terminal of the network device control and managing system according to an embodiment of the present invention.

As shown in FIG. 5, the control and managing terminal 540 reads the subscriber's network device information and subscriber information from the database server 510 and provides hierarchical and combined information in the web format to the manager.

The hierarchical and combined information provided by the control and managing terminal 540 includes TIMS, NeOSS SO, NeOSS FM client information and facilities information, IDSS client session information, ID, password, NeSAS client access history, subscriber station information (PC, wireless local area network (WLAN)card), Dr. NESPOT AP test, control module, NetIS malfunction history information, CQMS wireless quality information, NESPOT NMS Netspot client information, xDSL-NMS, and NAS-NMS concentrator information.

FIG. 6 shows a second exemplified screen displayed when the control and managing terminal of the network device control and managing system according to an embodiment of the present invention.

As shown in FIG. 6, the control and managing terminal 540 selects a specific network device configuring a specific network, checks the state, transmits a control instruction to the network device (including the concentration switch 400, the concentrator 300, and the access point (AP) 200), receives a response message from the network device, and displays results shown with a dotted circle in FIG. 6.

Figure 7B:
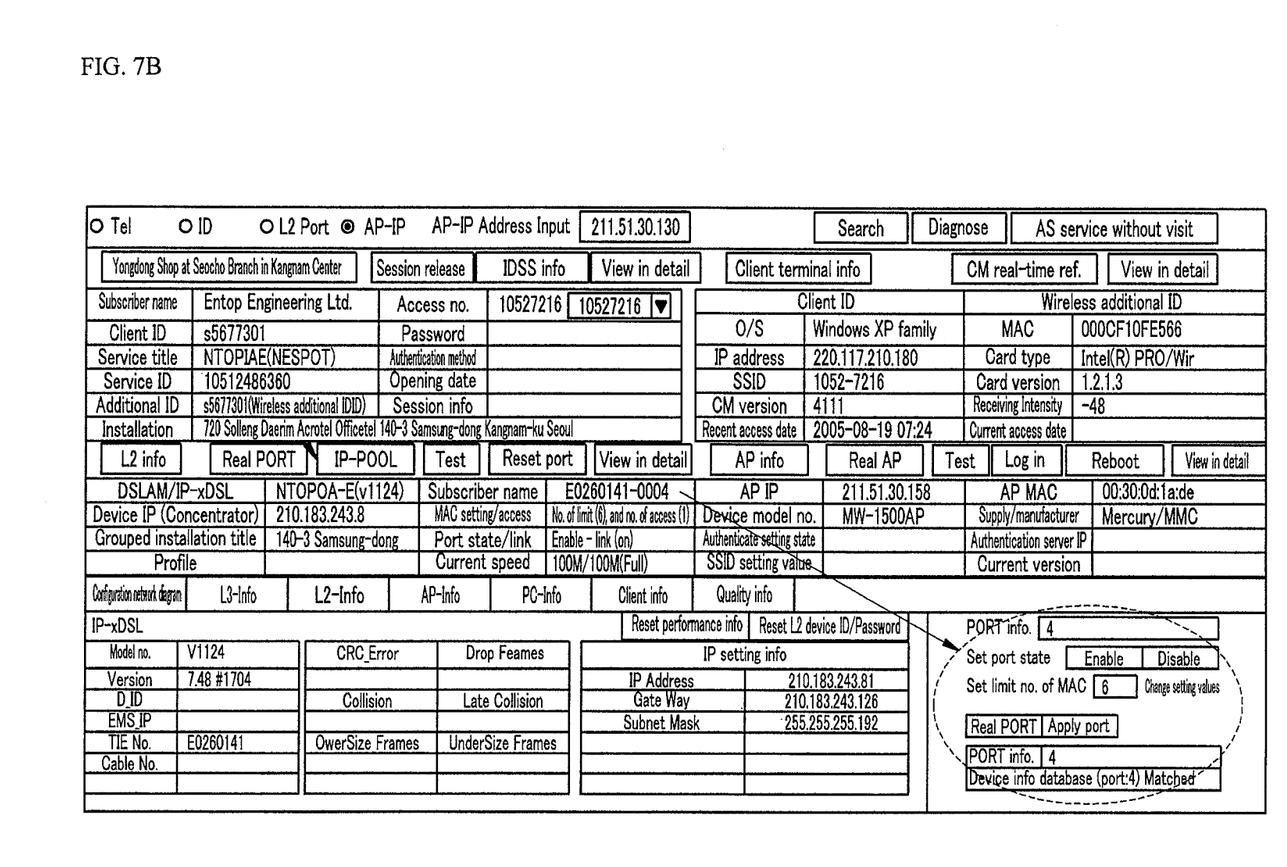
FIG. 7B shows an exemplified screen displayed when a real port is detected in the control and managing terminal of the network device control and managing system according to an embodiment of the present invention.

As shown FIG. 7 and FIG. 8, real device information including a real AP IP and a real port is detected by comparing information omitted from the network device information and subscriber information provided by the database server, and a port number, a MAC address, and Internet protocol (IP) address of the non-matched network device.

FIG. 7A shows an exemplified screen displayed when a real AP IP is detected in the control and managing terminal of the network device control and managing system according to an embodiment of the present invention.

As shown in FIG. 7A, the control and managing terminal 540 compares network device information provided by the database server 510, information omitted from the subscriber information, and non-matched information with a port number, a MAC address, and an Internet protocol (IP)address for a specific network device and detects a real AP IP that is real equipment information.

FIG. 7B shows an exemplified screen displayed when a real port is detected in the control and managing terminal of the network device control and managing system according to an embodiment of the present invention.

As shown in FIG. 7B, the control and managing terminal 540 compares network device information provided by the database server 510, information omitted from the subscriber information, and non-matched information with a port number, a MAC address, and an Internet protocol (IP) address for a specific network device and detects a real AP IP that is real equipment information.

Embodiments of the present invention are not only realized by the method and device, but also realized by a program for realizing the functions corresponding to the configuration of embodiments of the present invention or a recording medium for recording the program, which can be easily realized by a person skilled in the art.

While embodiments of this invention has been described, it is to be understood that the invention is not limited to the disclosed embodiments, but, on the contrary, is intended to cover various modifications and equivalent arrangements included within the spirit and scope of the appended claims.

For example, as stated above, the network device control and managing system in the embodiment of the present invention uses the wireless Internet environment including the access point, and the wired Internet environment is also available.

According to the above-described configuration, the system for hierarchically controlling and managing the network devices reads network device information and subscriber information on a predetermined subscriber station including client line information and client information according to the manager's request from the database server, combines the information, and provides the same in the hierarchical web format so that the manager may easily use the information, and hence, the state of the devices can be easily searched in the hierarchical (L3-L2-AP) manner, and problem states of a specific network can be quickly detected. Further, since the network devices and the subscriber station can be remotely tested and controlled according to the manager's request, the software of a specific network device can be remotely updated, and the subscriber's after sales service request is remotely processed.

What is claimed is:

1. A system for receiving an after sales service (AS) request from a subscriber station connected to a network and controlling and managing at least one of the subscriber station and associated network devices in response to the AS request, the system comprising:

a server comprising a hardware processor, the server configured to:

store information on the AS request from the subscribed station, to store information on the subscriber station that transmits the AS request, and to hierarchically store information on network devices including an access point (AP), a concentrator, and a concentration switch, which connect the subscriber station to the network; and provide the hierarchically stored information on the subscriber station and the information on the network devices in the database server according to a received predetermined data request; and a control and managing terminal configured to receive the information on the subscriber station and the network devices based on the information on the AS request, to generate combined state information by combining the received information on the subscriber station and the received information on the network devices, to provide the combined state information of the subscriber station and the network devices in a hierarchical manner and in a web format, and to remotely control and manage at least one of the subscriber station and the network devices in response to an input made based on the provided combined state information, wherein the control and managing terminal is configured to transmit a predetermined control message to at least one of the network devices used to connect the subscriber station to the network, receives a message in response to the transmitted control message, updates the combined state information according to information contained in the received response message, and provides the updated combined state information in the hierarchical manner and in the web format to the manager.

2. The system of claim 1, the system comprising a plurality of modules comprising:

a storage module configured to store information on the AS request, to store the information on the subscriber station that transmit the AS request, and to store information on the network devices that connect the subscriber station to the network;

a web providing module configured to provide combined state information in the hierarchical manner and in the web format based on the information stored in the storage module;

a control and managing module configured to generate a predetermined control instruction based on a manager request provided by the manager, to transmit the predetermined control instruction to at least one of the network devices connecting the subscriber station to the network, and to receive a predetermined response message in response to the predetermined control instruction; and a system control module configured to control the storage module, the web providing module, and the control and managing module, to receive the information on the network devices and the information on the subscriber station from the database server according to the received manager request, to store the received information on the network device and the received information on the subscriber station in the storage module, and to provide the predetermined response message provided by the control and managing module to the web providing module and the storage module.

3. The system of claim 1, further comprising a connection manager server for transmitting/receiving data to/from the control and managing terminal, and storing and managing data flow information between the network device and the control and managing terminal.

4. The system of claim 3, further comprising an authentication server for authenticating the manager according to an authentication request input from the web server.

5. The system of claim 4, wherein the system control module finds information that is omitted or unmatched from among information provided by the database server through comparison with the predetermined response message.

6. The system of claim 4, wherein the control and managing module receives data flow information from the connection manager server, transmits the same to the storage module, and transmits real-time data flow information received by requesting data flow information from the connection manager server according to the manager's request provided by the input module to the system control module.

7. The system of claim 2, wherein the system control module remotely controls a predetermined subscriber station according to the manager's request.

8. The system of claim 7, further comprising:
an input module for receiving the manager's request and transmitting the manager's request to the system control module and control and managing module; and
a network module including a network interface, being connected to a second network, and transmitting/receiving data to/from the control and managing module, the web providing module, and the system control module.

9. The system of claim 1, wherein the information on the subscriber station includes client information, subscriber station information, and facilities information.

10. A method for providing information on a subscriber station requesting an after sales service (AS) and information on network devices connecting the subscriber station to a network in a control and managing terminal of a system for controlling and managing at least one of the subscriber station and the network devices in response to the AS request, the method comprising:
   a) receiving information on a subscriber station, the subscriber station comprising a hardware processor, the information requesting an AS and information on network devices used to connect the subscriber station to a network from a database server of the network device control and managing system according to the manager's client information request, wherein the database server hierarchically stores the information on the network devices including an access point (AP), a concentrator, and a concentration switch and the information on the subscriber station corresponding to information on the AS request provided by the subscriber station;
   b) generating combined state information in a hierarchical manner and in a web format by combining the received information on the subscriber station and the received information on the network devices and providing the combined state information to the manager;
   c) receiving a network configuration device state request from the manager and generating a state request message;
   d) transmitting the state request message to at least one of the network devices used to connect the subscriber station to the network; and
   e) receiving a response message from the at least one of the network devices in response to the state request message, and updating the combined state information based on the received response message and providing the updated combined state information in the hierarchical manner and in the web format to the manager.

11. The method of claim 10, wherein e) comprises:
determining omitted or unmatched information by comparing the provided combined state information and information included in the response message received from the at least one of the network devices; and
updating the combined state information based on the determined omitted and unmatched information.

12. The method of claim 11, wherein the manager's client information request includes at least one of a telephone number, a client ID, a device port number, and an access point (AP) Internet protocol (IP) address.

13. The method of claim 11, further comprising, before a),
   i) requesting an access from all web server of the network device control and managing system; and
   ii) authenticating the user by an authentication server of the network device control and managing system according to the access request.

14. The method of claim 13, wherein ii) further comprises canceling the access to the web server without receiving user authentication from the authentication server.

15. The method of claim 10, wherein the subscriber information includes client information, subscriber station information, and facilities information.

16. A method for controlling an managing network devices and a subscriber station in a control and managing terminal of a system for controlling and managing the network devices and a subscriber station connected to the system through the network devices comprising an access point (AP), a concentrator, and a concentration switch, the method comprising:
   a) receiving information on a subscriber station, the subscriber station comprising a hardware processor, the information requesting an AS and information on network devices used to connect the subscriber station to a network from a database server of the network device control and managing system according to the manager's client information request, wherein the database server hierarchically stores the information on the network devices including an access point (AP), a concentrator, and a concentration switch and the information on the subscriber station corresponding to information on the AS request provided by the subscriber station;
   b) generating combined state information in a hierarchical manner and in a web format by combining the received information on the subscriber station and the received information on the network devices and providing the combination state information to the manager;
   c) receiving a state information request of at least one of the network devices from the manager and generating a state information request message;
   d) transmitting the state information request message to the at least one of the network devices used to connect the subscriber station to the network and receiving state information from the at least one of the network devices in response to the state information request message;
   e) receiving a control request for controlling the at least one of the network devices from the manager, and generating a predetermined control message; and
   f) transmitting the predetermined control message to the at least one of the network devices, receiving a response message from the at least one of the network devices in response to the transmitted control message, updating the combined state information according to information contained in the received response message, and providing the updated combined state information to the manager.

17. The method of claim 16, wherein the manager's client information request includes at least one of a telephone number, a client ID, a device port number, and an access point (AP) Internet protocol (IP) address.

18. The method of claim 17, further comprising, before a),
   i) requesting an access from a we server of the network device control and managing system; and
   ii) authenticating the user by an authentication server of the network device control and managing system according to the access request.

19. The method of claim 18, wherein ii) further comprises canceling the access to the web server when the user is not authenticated by the authentication server.

20. The method of claim 16, wherein the state information includes the number of IPs (Internet Protocols) to be allocated in the first device and the number of IPs in use.

21. The method of claim 16, wherein the predetermined control message is control information including port control information. profile request information, initialization information, and MAC control information.

* * * * *